United States Patent [19]

Ogura et al.

[11] Patent Number: 4,752,078
[45] Date of Patent: Jun. 21, 1988

[54] STEERING SYSTEM FOR FRONT AND REAR WHEELS OF AN AUTOMOTIVE VEHICLE

[75] Inventors: Masami Ogura; Junko Kurosawa; Tsuyoshi Sato, all of Saitama, Japan

[73] Assignee: Honda Giken Kogyo Kabushiki Kaisha, Tokyo, Japan

[21] Appl. No.: 40,220

[22] Filed: Apr. 20, 1987

[30] Foreign Application Priority Data

Apr. 18, 1986 [JP] Japan .................. 61-89291

[51] Int. Cl.$^4$ .............................. B62D 5/10
[52] U.S. Cl. .................. 280/91; 180/140; 403/334
[58] Field of Search .............. 280/91; 403/334, 335, 403/337, 342, 361; 180/140

[56] References Cited

U.S. PATENT DOCUMENTS

| | | | |
|---|---|---|---|
| 2,449,284 | 9/1948 | Dorman | 403/334 |
| 4,134,700 | 1/1979 | Nelson et al. | 403/334 |
| 4,407,598 | 10/1983 | Hendershot | 403/337 |
| 4,610,328 | 9/1986 | Kanazawa et al. | 280/91 |

FOREIGN PATENT DOCUMENTS 58-20563 2/1983 Japan .

*Primary Examiner*—Kenneth R. Rice
*Attorney, Agent, or Firm*—Irving M. Weiner; Joseph P. Carrier; Pamela S. Burt

[57] ABSTRACT

A system for steering the front and rear wheels of an automotive vehicle includes a front wheel steering mechanism including an output pinion shaft, a rear wheel steering mechanism including an input shaft, and a shaft assembly mechanically interconnecting the output pinion shaft and the input shaft. The shaft assembly comprises a front cross joint coupled to the output pinion shaft, a rear cross joint coupled to the input shaft, and a linkage shaft connected between the front and rear cross joints. A phase adjusting assembly is disposed between one of the front and rear cross joints and the linkage shaft for allowing the output pinion shaft and the input shaft to rotate relatively to each other to secure them in a desired phase.

12 Claims, 5 Drawing Sheets

# STEERING SYSTEM FOR FRONT AND REAR WHEELS OF AN AUTOMOTIVE VEHICLE

BACKGROUND OF THE INVENTION

1. Field of the Invention

The present invention relates to a steering system for simultaneously steering the front and rear wheels of an automotive vehicle.

2. Description of the Relevant Art

There are known steering systems for steering the rear wheels of an automotive vehicle simultaneously with the front wheels thereof, as disclosed in Japanese Laid-Open Patent Publication No. 58-20563, for example. The known steering systems of this type are conventionally assembled by putting the front wheels in a neutral position thereof with a front wheel steering mechanism, putting the rear wheels in a neutral position thereof with a rear wheel steering mechanism, then adjusting the front and rear wheels for toe-in, and finally mechanically and operatively interconnecting the output pinion shaft of the front wheel steering mechanism and the input shaft of the rear wheel steering mechanism through a linkage shaft. For accurately establishing the neutral positions of the front and rear wheels, it is necessary to machine the teeth or serrations of various components of the front and rear wheel steering mechanisms with high precision. This gear machining process involves a number of machining steps and results in an increase in the vehicle's cost. A time-consuming procedure has been required to connect the output and input shafts of the front and rear wheel steering mechanisms with the linkage shaft since the output and input shafts must be accurately placed in phase.

SUMMARY OF THE INVENTION

Accordingly, it is an object of the present invention to provide a system for steering the front and rear wheels of an automotive vehicle, the system having front and rear wheel steering mechanisms that can easily and quickly be connected to each other after front and rear wheels have individually been placed in neutral positions thereof and adjusted for toe-in.

Another object of the present invention is to provide a system for steering the front and rear wheels of an automotive vehicle, the system having front and rear wheel steering mechanisms including interconnected components that are not required to be highly accurately machined.

According to the present invention, there is provided a system for steering the front and rear wheels of an automotive vehicle, comprising: a front wheel steering mechanism including an output pinion shaft; a rear wheel steering mechanism including an input shaft; and a shaft assembly mechanically interconnecting the output pinion shaft and the input shaft, the shaft assembly comprising a front cross joint coupled to the output pinion shaft, a rear cross joint coupled to the input shaft, a linkage shaft connected between the front and rear cross joints, and phase adjusting means disposed between one of the front and rear cross joints and the linkage shaft for allowing the output pinion shaft and the input shaft to rotate relatively to each other to secure them in a desired phase.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
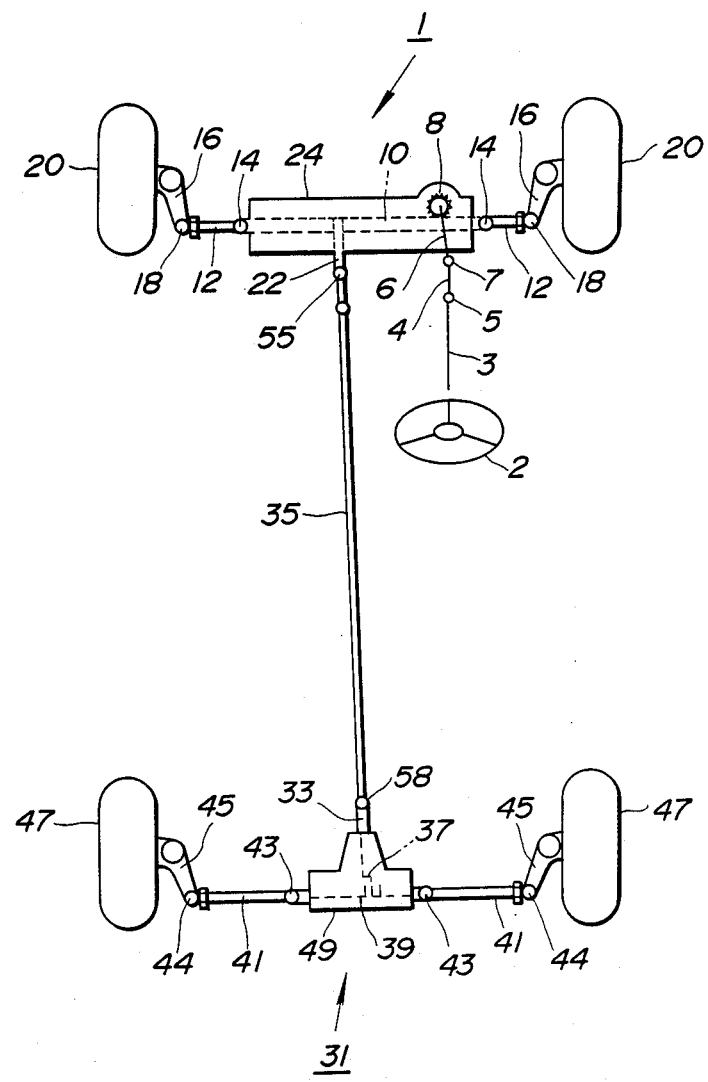
FIG. 1 is a schematic plan view of a system for steering the front and rear wheels of an automotive vehicle according to the present invention.

As shown in FIG. 1, an automotive vehicle has a front wheel steering mechanism, generally designated by the reference numeral 1. The front wheel steering mechanism 1 generally includes a steering wheel 2, a steering column (not shown) on which the steering wheel 2 is rotatably supported, a steering shaft 3 extending through the steering column and rotatable with the steering wheel 2, a steering joint 4 coupled to the steering shaft 3 through a universal joint 5, an input shaft 6 coupled to the steering joint 4 through a flexible joint 7 and having a pinion gear 8 on its lower end, and a rack 10 extending in the transverse direction of the automotive vehicle and meshing with the pinion gear 8. The front wheel steering mechanism 1 also includes a pair of tie rods 12 coupled to the opposite ends of the rack 10 by means of ball-and-socket joints 14, respectively, a pair of knuckle arms 16 coupled to the tie rods 12, respectively, by means of sockets 18 and supporting respective front wheels 20 steerably, and an output pinion shaft 22 meshing with the rack 10 and extending rearwardly from a gear box 24 in the longitudinal direction of the automotive vehicle. The pinion gear 8 and the rack 10 are housed in the gear box 24. Rotation of the steering wheel 2 is converted to linear motion by the pinion gear 8 and the rack 10. In response to movement of the rack 10 along its axis in one direction, the tie rods 12 are also moved linearly in the same direction to cause the knuckle arms 16 to steer the front wheels 20. The universal joint 5 and the flexible joint 7 are effective in preventing road shocks from being transmitted through the steering column to the driver.

A rear wheel steering mechanism, generally denoted by the reference numeral 31, generally includes an input shaft 33 coupled to the output pinion shaft 22 of the front wheel steering mechanism 1 through a linkage shaft or connecting shaft 35, a crankpin 37 operatively connected to the input shaft 33, an output shaft 39 coupled to the crankpin 37, a pair of tie rods 41 coupled to the opposite ends of the output shaft 39 by means of respective ball-and-socket joints 43, and a pair of knuckle arms 45 copuled to the tie rods 41, respectively, by means of sockets 44 and angularly movable upon linear movement of the tie rods 41 for steering rear wheels 47, respectively. The crankpin 37 and the output shaft 39 are housed in a gear box 49.

Figure 2:
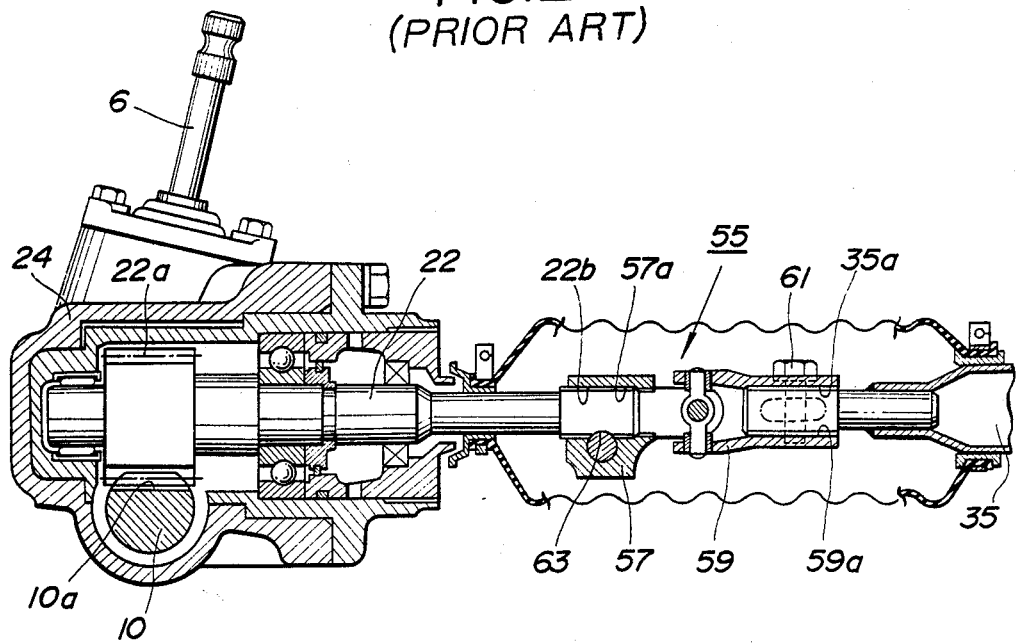
FIG. 2 is a cross-sectional view of a steering system in which the output pinion shaft of a front wheel steering mechanism and a linkage shaft are coupled by a conventional arrangement.

Heretofore, a wheel-wheel steering system having such front and rear wheel steering mechanisms 1, 31 is assembled as follows: The output pinion shaft 22 of the front wheel steering mechanism 1 and the input shaft 33 of the rear wheel steering mechanism 31 are interconnected by the linkage shaft 35 through the respective cross joints 55, 58. More specifically, as shown in FIG. 2, serrations 10a on the rack 10, serrations 22a on one end of the output pinion shaft 22, serrations 22b on the other end of the output pinion shaft 22, serrations 57a on a front yoke 57 of the cross joint 55, serrations 35a on the front end of the linkage shaft 35, and serrations 59a on a rear yoke 59 of the cross joint 55 are adjusted in phase. Thereafter, the rear yoke 59 and the front end of the linkage shaft 35 are coupled to each other by means of a bolt 61, thereby mechanically interconnecting the front and rear wheel steering mechanisms 1, 31. A bolt 63 prevents the output pinion shaft 22 from being dislodged from the front yoke 57 of the cross joint 55. According to the conventional structure shown in FIG. 2, the serrations must be machined highly accurately since fine adjustment of the components is impossible after they have been assembled together.

Figure 3:
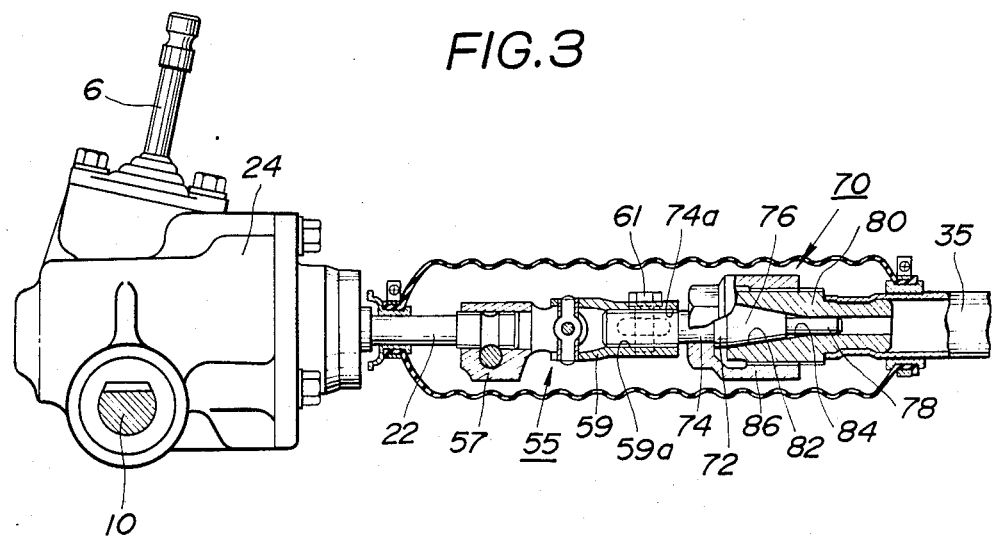
FIG. 3 is a cross-sectional view of a phase adjusting means according to a first embodiment of the present invention, the phase adjusting means being disposed between a front wheel steering mechanism and a linkage shaft.

FIG. 3 shows a phase adjusting means 70 according to a first embodiment of the present invention for allowing the output pinion shaft 22 and the linkage shaft 35 to rotate relatively to each other to secure them in a desired phase. The phase adjusting means 70 includes a first phase adjusting element 72 comprising a shank 74 having serrations 74a splined to the serrations 59a of the rear yoke 59 and fastened to the rear yoke 59 by the bolt 61, a conical member 76 fixed coaxially to the shank 74 and having a larger-diameter bottom with its diameter larger than the diameter of the shank 74, and a guide pin 78 projecting coaxially from the conical member 76 away from the shank 74, a second phase adjusting element 80 secured to the front end of the linkage shaft 35 by a suitable means such as welding and including a conical recess 82 in which the conical member 76 of the first phase adjusting element 72 is relatively rotatably fitted, and a guide hole 84 defined therein along a central axis thereof and in which the guide pin 78 is inserted, and a lock nut 86 fitted over the shank 74 and the second phase adjusting element 80 for securing the first and second phase adjusing elements 72, 80 after the output pinion·shaft 22 and the linkage shaft 35 have accurately been adjusted in phase through relative rotation of the first and second phase adjusting elements 72, 80.

The phase adjusting means operates as follows: First, the front and rear wheels 20, 47 are placed in steering neutral positions, and adjusted for toe-in. Then, the front yoke 57 of the cross joint 55 is coupled to the output pinion shaft 22, and the shank 74 of the first phase adjusting element 72 is splined and bolted to the rear yoke 59. The guide pin 78 of the first phase adjusting element 72 is inserted into the guide hole 84 of the second phase adjusting element 80, and the conical member 76 is rotated in the conical recess 82 to adjust the output pinion shaft 22 and the linkage shaft 35 in phase. After the phase adjustment, the lock nut 86 is threaded over the outer periphery of the second phase adjusting element 80 to secure the elements 72, 80 to each other. Since the output pinion shaft 22 and the linkage shaft 35 can freely be adjusted in phase through their relative rotation, it is not necessary to machine the serrations of the rear end of the output pinion shaft, the serrations of the front yoke, and the serrations of the rear yoke with high accuracy.

Figure 4:
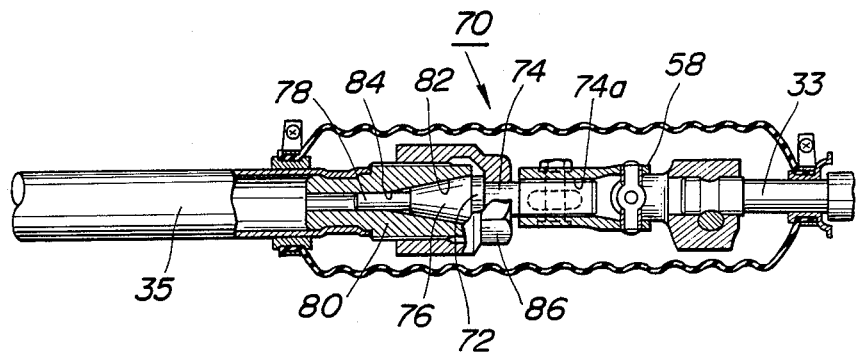
FIG. 4 is a cross-sectional view of the phase adjusting means of FIG. 3 which is disposed between a rear wheel steering mechanism and the linkage shaft.

As shown in FIG. 4, the phase adjusting means 70 may be coupled between the rear end of the linkage shaft 35 and the input shaft 33 of the rear wheel steering mechanism 31 through a cross joint 58.

Figure 5:
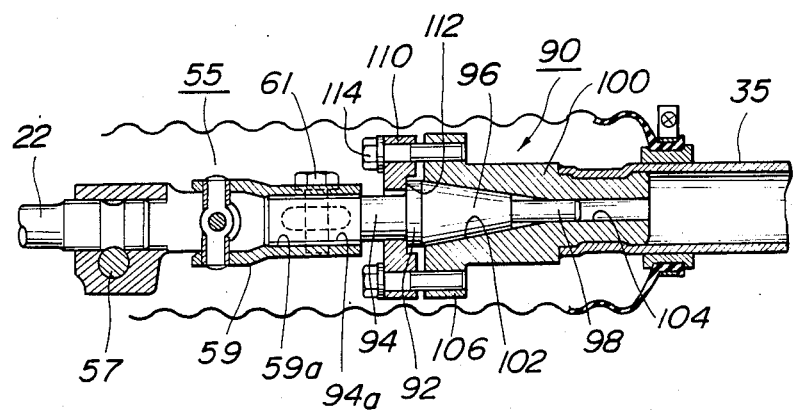
FIG. 5 is a cross-sectional view of a phase adjusting means according to a second embodiment of the present invention, the phase adjusting means being disposed between a front wheel steering mechanism and a linkage shaft.
Figure 6:
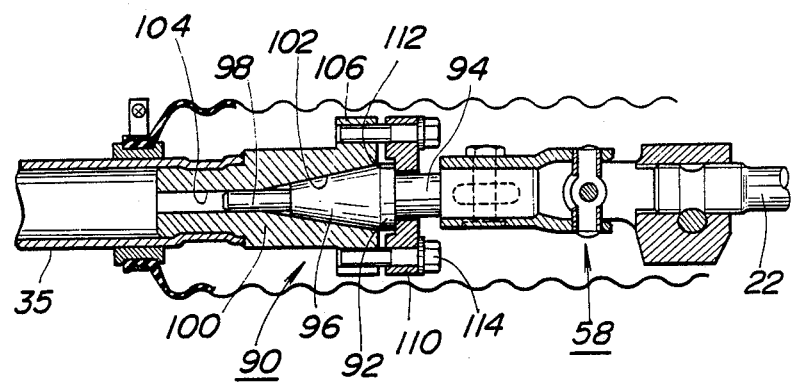
FIG. 6 is a cross-sectional view of the phase adjusting means of FIG. 5 which is disposed between a rear wheel steering mechanism and the linkage shaft.

FIG. 5 illustrates a phase adjusting means 90 in accordance with a second embodiment of the present invention. The phase adjusting means 90 includes a first modification 92 of the first phase adjusting element, comprising a shank 94 having serrations 94a splined to the serrations 59a of the rear yoke 59 and fastened to the rear yoke 59 by the bolt 61, a conical member 96 fixed coaxially to the shank 94 and having a larger-diameter bottom with its diameter larger than the diameter of the shank 94, and a guide pin 98 projecting coaxially from the conical member 96 away from the shank 94, a first modification 100 of the second phase adjusting element secured to the front end of the linkage shaft 35 as by welding and including a conical recess 102 in which the conical member 96 of the 92 of the first phase adjusting element is relatively rotatably fitted, a guide hole 104 in which the guide pin 98 is inserted, and a flange 106 disposed on the front end of the element 100, a ring 110 substantially identical in diameter of the flange 106 and having a circular recess 112 defined centrally therein and having a circular edge engaging the larger-diameter bottom of the conical member 96, and a plurality of 114 inserted axially through the ring 110 and the flange 106 to secure the first modifications 92, 100 of the first and second phase adjusting elements after the shafts 22, 35 have been adjusted in phase. The phase adjusting means 90 of the second embodiment may be coupled between the rear end of the linkage shaft 35 and the input shaft 33 of the rear wheel steering mechanism 31 through the cross joint 58, as shown in FIG. 6.

The phase adjusting means of the second embodiment operates in substantially the same manner as the phase adjusting means of the first embodiment.

Figure 7:
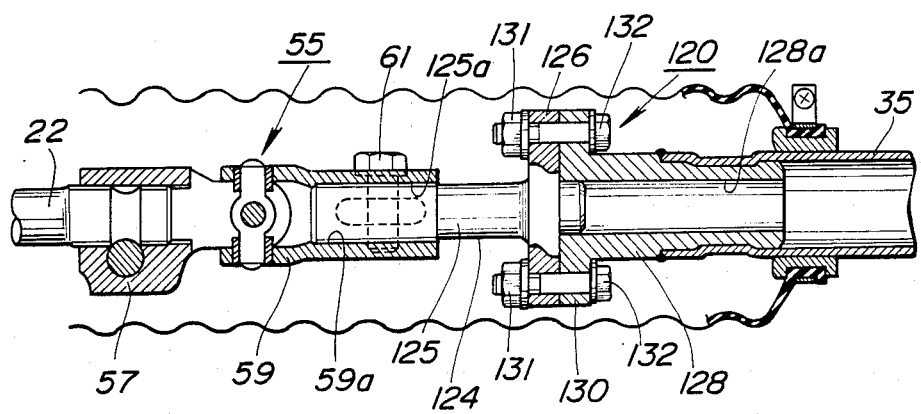
FIG. 7 is a cross-sectional view of a phase adjusting means according to a third embodiment of the present invention, the phase adjusting means being disposed between a front wheel steering mechanism and a linkage shaft.
Figure 8A:
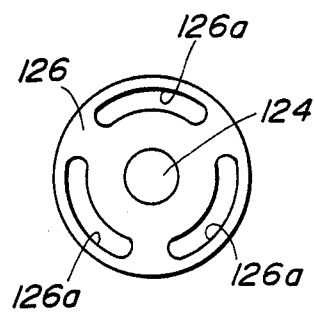
FIGS. 8(a) and 8(b) are front elevational views of phase adjusting flanges in the phase adjusting means illustrated in FIG. 7.
Figure 8B:
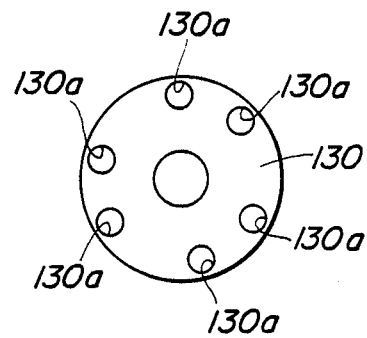
Figure 9:
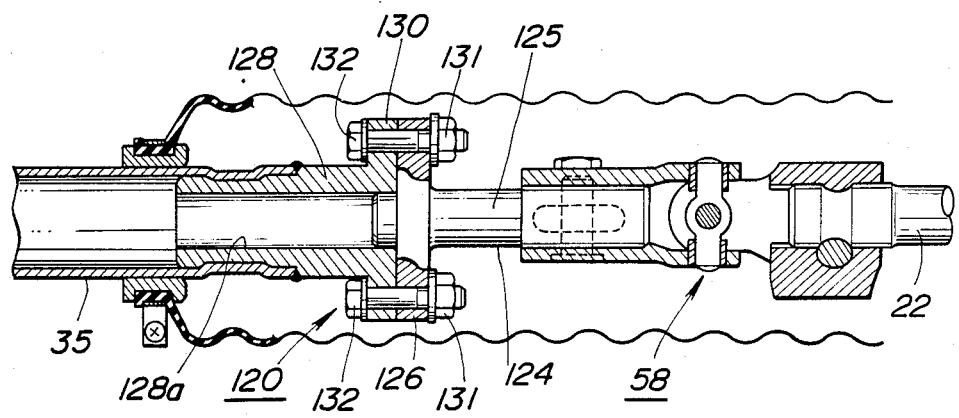
FIG. 9 is a cross-sectional view of the phase adjusting means of FIG. 7 which is disposed between a rear wheel steering mechanism and the linkage shaft.

As shown in FIG. 7, a phase adjusting means 120 according to a third embodiment of the present invention includes a second modification 124 of the first phase adjusting element, comprising a shank 125 having serrations 125a splined to the serrations 59a of the rear yoke 59 and fastened to the rear yoke 59 by the bolt 61, and an annlar phase adjusting flange 126 disposed near the rear end of the shank 125, a second sleeve-like modification 128 of the second phase adjusting element secured to the front end of the linkage shaft 35 as by welding and having on its front end a phase adjusting flange 130 engaging the flange 126 of the second modification 124 of the first phase adjusting element, and a plurality of bolts 132 and nuts 131. As shown in FIG. 8(a), the flange 126 of the second modification 124 of the first phase adjusting element has three arcuate holes 126a which are circumferentially spaced apart. As illustrated in FIG. 8(b), the flange 130 of the second modification 128 of the second phase adjusting element has three circumferentially spaced-apart pairs of adjacent circular holes 130a, the three hole pairs axially opening into the holes 126a, respectively, of the flange 126. It can easily be understood that the phase adjusting means 120 of the third embodiment may be coupled between the rear end of the linkage shaft 35 and the input shaft 33 of the rear wheel steering mechanism 31 through the cross joint 58, as shown in FIG. 9.

The phase adjusting means 120 of the third embodiment operates as follows: After the front and rear wheels 20, 47 have been put in steering neutral positions and adjusted for toe-in, the cross joint 55 is coupled to the output pinion shaft 22, and one end of the shank 125 of the second modification 124 of the first phase adjusting element is splined and bolted to the rear yoke 59. The other end of the shank 125 which projects from the flange 126 is inserted into an axially extending central hole 128a defined in the second modification 128 of the second phase adjusting element until the phase adjusting flanges 126, 130 are brought into abutting engagement with each other. Then, the bolts 132 are inserted through the flanges 126, 130, and the nuts 131 are loosely threaded over the respective bolts 132. The output pinion shaft 22 and the linkage shaft 35 are relatively rotated within an angular range allowed by the arcuate holes 126a of the flange 126 for phase adjustment. Finally, the nuts 131 are firmly tightened on the bolts 132 to secure the second modifications 124, 128 of the first and second phase adjusting elements to each other.

The phase adjusting means in each of the above embodiments may alternatively be disposed somewhere on the linkage shaft 35 to adjustably interconnect longitudinally divided members of the linkage shaft.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A system for steering the front and rear wheels of an automotive vehicle, comprising:
   a front wheel steering mechanism including an output pinion shaft;
   a rear wheel steering mechanism including an input shaft;
   a shaft assembly mechanically interconnecting said output pinion shaft and said input shaft; and
   said shaft assembly comprising a front cross joint coupled to said output pinion shaft, a rear cross joint coupled to said input shaft, a linkage shaft connected between said front and rear cross joints, and phase adjusting means disposed between one of said front and rear cross joints and said linkage shaft for allowing said output pinion shaft and said input shaft to rotate relatively to each other to secure them in a desired phase;
   said phase adjusting means comprises a first phase adjusting element including a shank having one end coupled to said one cross joint and a conical member larger in diameter than said shank and secured to the other end of said shank, a second phase adjusting element fixed to said linkage shaft and having a conical recess in which said conical member of the first phase adjusting element is rotatably fitted, and a lock nut fitted over said shank of the first phase adjusting element and said second phase adjusting element for securing said first phase adjusting element to said second phase adjusting element.

2. A system according to claim 1, wherein said first phase adjusting element includes a guide pin on a tip end of said conical member, said second phase adjusting element having a guide hole defined therein along a central axis thereof, said guide pin being inserted in said guide hole.

3. A system for steering the front and rear wheels of an automotive vehicle, comprising:
   a front wheel steering mechanism including an output pinion shaft;
   a rear wheel steering mechanism including an input shaft;
   a shaft assembly mechanically interconnecting said output pinion shaft and said input shaft; and
   said shaft assembly comprising a front cross joint coupled to said output pinion shaft, a rear cross joint coupled to said input shaft, a linkage shaft connected between said front and rear cross joints, and phase adjusting means disposed between one of said front and rear cross joints and said linkage shaft for allowing said output pinion shaft and said input pinion shaft to rotate relatively to each other to secure them in a desired phase;
   said phase adjusting means comprises a first phase adjusting element including a shank having one end coupled to said one cross joint and a conical member larger in diameter than said shank and secured to the other end of said shank, a second phase adjusting element fixed at one end thereof to said linkage shaft and having an annular flange on the other end thereof and a conical recess in which said conical portion of the first phase adjusting element is rotatably fitted, a ring fitted over said shank of the first phase adjusting element and engaging said annular flange of the second phase adjusting element, and a plurality of bolts fastening said ring to said flange to secure said first and second phase adjusting elements to each other.

4. A system according to claim 3, wherein said third phase adjusting element includes a guide pin on a tip end of said conical member, said fourth phase adjusting element having a guide hole defined therein along a central axis thereof, said guide pin being inserted in said guide hole.

5. A system for steering the front and rear wheels of an automotive vehicle, comprising:
   a front wheel steering mechanism including an output pinion shaft;
   a rear wheel steering mechanism including an input shaft;
   a shaft assembly mechanically interconnecting said output pinion shaft and said input shaft; and said shaft assembly comprising a front cross joint coupled to said output pinion shaft, a rear cross joint coupled to said input shaft, a linkage shaft connected between said front and rear cross joints, and phase adjusting means disposed between one of said front and rear cross joints and said linkage shaft for allowing said output pinion shaft and said input pinion shaft to rotate relatively to each other to secure them in a desired phase;

said phase adjusting means comprises a first phase adjusting element including a shank having one end coupled to said one cross joint and a first flange near the other end thereof which projects from the first flange, a second phase adjusting element fixed at one end thereof to said linkage shaft and having a second flange on the other end thereof engaging said first flange and an axially extending hole in which said projecting end of the shank is inserted, and a plurality of bolt/nut assemblies fastening said first and second flanges together to secure said first and second phase adjusting elements to each other.

6. A system according to claim 5, wherein said first flange of the first phase adjusting element has three circumferentially spaced-apart arcuate holes formed therein.

7. A system according to claim 6, wherein said second flange of the second phase adjusting element has six circular holes formed therein which are grouped into three pairs of adjacent holes which open respectively into said arcuate holes of said first flange.

8. A system for steering the front and rear wheels of an automotive vehicle, comprising:

a front wheel steering mechanism including an output shaft;

a rear wheel steering mechanism including an input shaft;

a connecting shaft mechanically interconnecting said output shaft and said input shaft; and phase adjusting means disposed between one of said input and output shafts and said connecting shaft for allowing said output and input shafts to rotate relatively to each other to secure them in a desired phase;

said phase adjusting means comprises a first phase adjusting member including a conical member mounted on one end of said output shaft and having a bottom with its diameter larger than the diameter of said output shaft and a guide pin integral with a tip end of said conical member, a second phase adjusting member mounted on one end of said connecting shaft and having a conical recess in which said conical member is rotatably fitted, and a guide hole extending along a central axis thereof and in which said guide pin is inserted, and a lock nut fitted over said output shaft and said second phase adjusting member for securing said first and second phase adjusting members.

9. A system for steering the front and rear wheels of an automotive vehicle, comprising:

a front wheel steering mechanism including an output shaft;

a rear wheel steering mechanism including an input shaft;

a connecting shaft mechanically interconnecting said output shaft and said input shaft; and phase adjusting means disposed between one of said input and output shafts and said connecting shaft for allowing said output and input shafts to rotate relatively to each other to secure them in a desired phase;

said phase adjusting means comprises a first phase adjusting member including a conical member mounted on one end of said output shaft and having a bottom with its diameter larger than the diameter of said output shaft and a guide pin integral with a tip end of said conical member, a second phase adjusting member mounted at one end thereof on said connecting shaft and having a conical recess in which said conical member is rotatably fitted, a guide hole extending along a central axis thereof and in which said guide pin is inserted, and a flange disposed on the other end of the second phase adjusting member, a ring fitted over said first phase adjusting member and engaging said flange, and a plurality of bolts fastening said ring to said flange.

10. A system for steering the front and rear wheels of an automotive vehicle, comprising:

a front wheel steering mechanism including an output shaft;

a rear wheel steering mechanism including an input shaft;

a connecting shaft mechanically interconnecting said output shaft and said input shaft; and phase adjusting means disposed between one of said input and output shafts and said connecting shaft for allowing said output and input shafts to rotate relatively to each other to secure them in a desired phase;

said phase adjusting means comprises a first phase adjusting member mounted on one end of said output shaft and having a first flange on an outer periphery thereof, a second phase adjusting member fixed at one end thereof to said connected shaft and having a second flange on the other end thereof engaging said first flange and an axial hole in which an end of said first phase adjusting member is inserted, and a plurality of bolt/nut assemblies fastening said first and second flanges together.

11. A system according to claim 10, wherein said first flange of the first phase adjusting member has three circumferentially spaced-apart arcuate holes formed therein.

12. A system according to claim 11, wherein said second flange of the second phase adjusting member has six circular holes formed therein which are grouped into three pairs of adjacent holes which open respectively into said arcuate holes of said first flange.

* * * * *

UNITED STATES PATENT AND TRADEMARK OFFICE
CERTIFICATE OF CORRECTION

PATENT NO. : 4,752,078

DATED : June 21, 1988

INVENTOR(S) : Masami OGURA et al.

It is certified that error appears in the above-identified patent and that said Letters Patent is hereby corrected as shown below:

```
Column 3, line 15, change "copuled" to --coupled--;
          line 64, change "adjusing" to --adjusting--.
Column 4, line 39, after "96 of the" insert --first
modification--;
          line 43, change "of" to --to--;
          line 46, after "plurality of" insert
--bolts--.
Column 6, line 55 (claim 4, line 1), change "third" to
--first--;
          line 57 (claim 4, line 3), change "fourth" to
--second--.
```

Signed and Sealed this

Twenty-fourth Day of January, 1989

Attest:

DONALD J. QUIGG

*Attesting Officer*　　　　*Commissioner of Patents and Trademarks*